United States Patent
Mowrey et al.

(10) Patent No.: US 6,878,231 B2
(45) Date of Patent: Apr. 12, 2005

(54) ONE-PART SOLVENT-BASED ADHESIVE FOR BONDING POLYMER MATERIALS

(75) Inventors: Douglas H. Mowrey, Titusville, PA (US); Patrick A. Warren, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/377,069

(22) Filed: Feb. 28, 2003

(65) Prior Publication Data

US 2004/0168760 A1 Sep. 2, 2004

(51) Int. Cl.[7] .......................... C09J 123/28; C08K 5/54; C08K 5/5455; C08K 5/5475; B29C 47/00
(52) U.S. Cl. .................. 156/333; 156/244.11; 156/245; 156/327; 524/543; 524/551; 524/588
(58) Field of Search ................................. 156/245, 327, 156/333, 244.11; 524/543, 551, 588

(56) References Cited

U.S. PATENT DOCUMENTS

| | | | |
|---|---|---|---|
| 4,031,120 A | 6/1977 | Gervase | |
| 4,299,754 A | 11/1981 | Shiomi et al. | |
| 4,608,415 A | 8/1986 | Nakajima et al. | |
| 4,612,252 A | * 9/1986 | Sagane et al. | 428/516 |
| 4,975,488 A | * 12/1990 | Furukawa et al. | 525/100 |
| 4,997,882 A | 3/1991 | Martz et al. | |
| 5,051,474 A | 9/1991 | Warren et al. | |
| 5,130,373 A | 7/1992 | Ashihara et al. | |
| 5,223,575 A | 6/1993 | Mori et al. | |
| 5,319,032 A | 6/1994 | Martz et al. | |
| 5,344,879 A | * 9/1994 | Inoue et al. | 525/100 |
| 5,397,602 A | 3/1995 | Martz et al. | |
| 5,432,246 A | 7/1995 | Fenn et al. | |
| 5,466,534 A | * 11/1995 | Newby | 428/457 |
| 5,623,044 A | 4/1997 | Chiao | |
| 6,001,469 A | 12/1999 | Verardi et al. | |
| 6,512,039 B1 | 1/2003 | Mowrey | |
| 6,534,235 B1 | * 3/2003 | Hanabata et al. | 430/191 |
| 6,649,084 B2 | * 11/2003 | Morikawa et al. | 252/182.22 |
| 2003/0087075 A1 | * 5/2003 | Peters et al. | 428/212 |

FOREIGN PATENT DOCUMENTS

| | | |
|---|---|---|
| EP | 0187171 | 7/1986 |
| JP | 51-24316 | 7/1976 |
| JP | 57036128 | 2/1982 |
| JP | 61215667 | 9/1986 |

* cited by examiner

Primary Examiner—Jeffrey B. Robertson
(74) Attorney, Agent, or Firm—Miles B. Dearth

(57) ABSTRACT

What is disclosed are adhesives and bonding methods employing a single coat of a solvent-based adhesive that effectively bonds thermoplastic polymers and especially thermoplastic elastomers. The adhesive components are a organosilane component selected from organosilane-isocyanate adduct and isocyanato-organosilane, a post-chlorinated polymer containing propylene repeating units or derivative thereof, and solvent. Also disclosed are methods for joining a rigid, structural substrate to a molten polymer such as a TPE via injection molding or extrusion. Durable adhesion between the adhesive treated portion of the rigid substrate and the melt-processed polymer is achieved with or without a previous heat treatment on the adhesive-coated substrate prior to joining to the thermoplastic melt.

10 Claims, No Drawings

ONE-PART SOLVENT-BASED ADHESIVE FOR BONDING POLYMER MATERIALS

FIELD OF THE INVENTION

The invention pertains to solvent-based polymer-bonding adhesives, such as thermoplastic elastomers and elastomer vulcanizates to similar or dissimilar substrates. The adhesives employ a silane-containing component and a chlorinated polymer.

BACKGROUND OF THE INVENTION

It is well known that thermoplastic articles formed from a variety of polyolefin-containing plastic materials have widely varying surface properties, including surface tension, roughness and flexibility. As substrates used in forming a bonded composite, achieving durability, i.e., environmentally-resistant bonding has been a continuing challenge. There are many known adhesion promoters used as tie-coats, or primers for paints on polyolefin-based materials. Applying a tie coat is normally an added step in the coating process. The adhesion promoter is usually applied in a thin layer, normally about 6 to 10 microns ($\mu$m).

Known adhesion promoters for coatings olefin-based thermoplastic surfaces contain chlorinated polyolefins, some examples of which are described in U.S. Pat. Nos. 4,997,882; 5,319,032 and 5,397,602. Others include carboxy-modified polyolefins. See U.S. Pat. No. 4,299,754 teaching carboxylate-modified polyolefins in aromatic or aliphatic hydrocarbon or a chlorinated hydrocarbon.

Performance obtained with chlorinated polyolefin in tie-layers for coatings is not predictive for bonding of olefin-based articles to substrates typically encountered, such as steel and aluminum. This is demonstrated in an article in the Journal of Coating Technology, 65, No. 827 p. 21 (1993) for chlorinated polyolefins.

In the case bonding rigid substrates in-line to a molten olefin-based thermoplastic profile or in insert-injection molding, temperatures above the processing temperature or heat dwell times must be avoided. Melt-processible thermoplastic elastomers, or TPE's, TPV's, TPO's (hereinafter collectively, "TPE") are desirable materials for forming such products as window channels, weatherstrips, and various automobile trim pieces. A rigid, structural substrate such as metal or rigid thermoplastic is joined in-line to the molten profile. In similar fashion, there are known methods where a rigidifying substrate and TPE are joined by insert injection molding. Improved adhesion between the substrate and TPE is desired.

U.S. Pat. No. 5,051,474 to Warren, et al discloses adhesives comprising a linear polyester polyurethane, a halogenated polyolefin, a phenolic resin, and a cross-linker. The formulation is preferably utilized as a two-component adhesive for bonding polymer blend-based thermoplastic elastomers to various substrates such as metal.

U.S. Pat. No. 5,268,404 to Mowrey discloses a one-part adhesive composition exhibiting strong rubber-to-metal bonds with excellent environmental resistance without the necessity of first priming the metal surface. The composition comprises a halogenated polyolefin, an aromatic nitroso compound, metal oxide such as zinc oxide or magnesium oxide, and optionally a vulcanizing agent such as sulfur or selenium, a phenolic epoxy resin, or carbon black.

U.S. Pat. No. 5,432,246 to Fenn et al. discloses a silane oligomer made from a secondary amino-alkoxy silane, a polyisocyanate and optionally a single isocyanate group, resulting in a substituted urea, with no free remaining isocyanate groups.

U.S. Pat. No. 6,512,039 to Mowrey discloses an adhesive designed to bond metal to peroxide cured elastomers. A representative formulation comprises from 10 to 20% of chlorosulfonated polyethylene, from 15–25% of an acid scavenger, from 35–45% of a polymaleimide, from 5–15% of precipitated silica, and 10–20% of an isocyanatosilane.

EP 0187171 discloses primers for thermoplastic polyolefins. Representative of these primer is a composition comprising chlorinated polyolefin, such as polypropylene, or graft-modified polypropylene, a crosslinkable binder and a crosslinking agent from selected from amines, amidoamines, isocyanates, poly-isocyanates, cyanurates, and acrylates containing —OH or —COOH groups.

Representative adhesives containing polyisocyanates, or bonding agents such as aminosilanes are known. U.S. Pat. No. 4,031,120 (Lord) discloses one-coat adhesives based on isocyanatosilane or an isocyanate-organosilane adduct. A variety of film formers are suggested. Optimally, the adhesive combines a nitroso compound. It would be industrially important to provide good primary adhesion bonding of a one-coat adhesive to more than one type of TPE under conditions of limited heat, such as extrusion bonding or cladding, or insert injection molding.

SUMMARY OF THE INVENTION

In one aspect the invention provides a method for bonding a TPE to a substrate by employing a single coat, liquid, solvent-based adhesive which comprises an organosilane component selected from organosilane-isocyanate adduct (A) or isocyanato-organosilane (B), and a post-chlorinated polymer comprising propylene repeating units. The typical nonvolatile component amounts are 10 to 90 wt. % of the organosilane component and 90 to 10 wt. % of post-chlorinated polymer and an overall solids content range of 5 to 50 wt. % in organic solvent.

In a method aspect, the invention includes a method of bonding a rigid, structural substrate to a molten polymer comprising contacting a molten polymer extrudate with a treated substrate. The substrate is treated by applying adhesive to the substrate, and drying. Another method aspect is a method for bonding a polymer injection melt which comprises contacting a polymer injection to a treated substrate contained in the injection mold. The substrate is treated by applying adhesive and drying. After contacting the injection melt to the adhesive-treated portion of the substrate, the composite is cooled, and removed form the mold. Durable adhesion between the adhesive treated portion of the inserted rigid substrate and the melt-processed polymer is achieved with or without a heat treatment applied to the adhesive-coated substrate prior to joining to the TPE.

DESCRIPTION OF THE PREFERRED EMBODIMENTS

The polymeric film former employed employs a base polymer which is post-chlorinated polypropylene (CPP). The base polymer comprises propylene repeating units. The film former includes derivatives of the post-chlorinated polypropylene. The base polymer weight average molecular weight is from 5,000 to 60,000, and preferably from 15,000 to 45,000. The chlorine content should be in the range of 10 to 60 weight %, preferably 20–50 weight %. As the base polymer comprising propylene repeating units, these include crystalline polypropylene, noncrystalline polypropylene, ethylene-propylene copolymer, ethylene-propylene-diene copolymer, propylene—$C_4$–$C_{10}$-α—olefin copolymer may be used. The base polymer may actually be a blend of polypropylene homopolymer and a copolymer comprising propylene repeating units may also be used. As an example of a blend, 25 to 95 wt. % of a propylene homopolymer is combined with from 5 to 75 wt %, preferably 10 to 60 wt. % of a random propylene copolymer containing repeating units based on 1-butene, 1-pentene, 1-hexene, 1-heptene, or 1-octene. Most preferred is chlorinated polypropylene available commercially under the Hardlen® designation. An example is Hardlen 13-LP chlorinated polypropylene from Toyo Kasei Kogyo Co., Ltd. Likewise suitable are commercial products under the Eastman CP-343-1 and CP-343-3 designations.

Many suitable derivatives of chlorinated polypropylene useful herein are known. Such a representative derivative is a polymer comprising propylene repeating units which is modified by incorporating one or more ethylenic unsaturated monomers, e.g., acrylate or methacrylate monomers, macromonomers, vinyl-functional organosilanes, liquid terminal ethylenic polydiene polymers and/or other graft-functional materials such as maleic acid anhydride, or maleimides. These are typically introduced into solution with chlorinated polypropylene, as taught in Japanese Kokai No. 24316 (1976), No. 36128 (1982), No. 215667 (1986), U.S. Pat. Nos. 4,608,415 and 5,130,373. The starting CPP material is for example Hardlen® 14-LLB manufactured by Toyo Kasei Kogyo Co., Ltd. of weight average molecular weight about 30,000, a chlorine content 27%, as a 30% solution in toluene. Up to 40 wt. parts total of monomers, and/or macromonomers and/or liquid polymers, etc., are present with 100 wt. parts of CPP in a peroxide-initiated reaction in solution of organic solvent. In another chlorinated polypropylene derivative, chlorinated polypropylene is derivatized ("maleated") with 0.1 to 10 wt. "phr" (parts per hundred CPP) of maleic acid anhydride according to known methods. As a further alternative derivative, maleic acid anhydride and acryl- or methacryl-modified hydrogenated polybutadiene, are incorporated using peroxide under known conditions.

As preferred derivatives of chlorinated polypropylene there are included maleic anhydride modified, or maleated chlorinated polypropylene. An exemplary maleic anhydride derivative can be prepared by combining 100 wt. parts of chlorinated polypropylene having a chlorine content, for example of 30% with 10 wt. parts of maleic anhydride and 300 parts of chlorobenzene in a reactor equipped with a reflux condenser, and dissolving by heating at 110° C. To this solution, 10 wt. parts of benzoyl peroxide are added thereto over a 6-hour period of addition. After completion of the addition, the mixture is allowed to further react under agitation for 3 hours at the same temperature. After the reaction is completed, chlorobenzene 3 hours at the same temperature. After the reaction is completed, chlorobenzene and unreacted maleic anhydride are distilled off under atmospheric pressure followed by vacuum stripping at 1 mmHg at 140° C. The bound maleic anhydride content of chlorinated polypropylene is about 8 wt. %, and the bonded chlorine content is about 27%. This derivative is readily taken up in the solvent used for formulating the adhesive in a typical solids range of 5 to 25 wt. %. Commercially available derivatives of chlorinated polypropylene modified with maleic anhydride include CP 343-1, from Eastman Chemical Company, Kingsport Term., HARDLEN® CY-9122P, from Toyo Kasei Kogyo, Ltd., Osaka, Japan, and HYPALON® CP-826, available from DuPont Dow Elastomers L.L.C., Wilmington, Del.

Specific exemplary derivatizing agents for CPP include liquid type polybutadiene number average molecular weight 500 to 5000, acrylic acid oligomer having a hydroxyl value of 95, molecular weight 570, a styrene/acrylonitile macromonomer having a terminal methacryloyl radical, isobutyl methacrylate macromonomer having a terminal methacryloyl radical, with molecular weight 6000, and 2-ethylhexylcarylate. The acrylic, maleic- or methacrylic-modified polybutadienes useful for derivatizing are known and made according to known methods such as by esterification reaction of hydrogenated OH-terminal polybutadiene to acrylic acid or methacrylic acid, (ii) by an addition reaction of the diisocyanate-hydroxyacrylate or hydroxymethacrylate prepolymer to OH—polybutadiene, (iii) by a ring-opening esterification reaction of hydrogenated polybutadiene containing a carboxyl group to glycidyl acrylate or glycidyl methacrylate, (iv) by an addition reaction of iminolacrylate or iminolmethacrylate to hydrogenated polybutadiene containing a carboxyl group, or (v) by the ENE reaction. Likewise, other suitable chlorinated polypropylene derivatives can be prepared using known polyolefin modifying agents containing functional groups such as sulfonate groups, carboxylic acid anhydride groups, hydroxyl groups, epoxide groups, carboxylic acid ester groups, carboxylic acid amide groups, carboxylic acid groups, and the like can be reacted with chlorinated polypropylene.

The adhesive compositions of this invention are prepared by conventional mixing in one or more organic solvents. For ease of application, as is conventional in this art, the components are mixed and dispersed in inert organic liquid diluents which are the primary carrier of the homogeneous, refined mixture of solids, and once the wet adhesive composition has been applied, the carrier is readily removed by evaporation. Examples of suitable organic solvents are, aromatic and halogenated aromatic hydrocarbons such as benzene, toluene, xylene, chlorobenzene, dichlorobenzene, and the like; halogenated aliphatic hydrocarbons such as trichloroethylene, perchloroethylene, propylene dichloride and the like; ketones such as methyl ethyl ketone, methyl isobutyl ketone, and the like; ethers, naphthas, etc., including mixtures of such carriers. Preferred organic solvents are xylene and toluene, ortho- and para-chlorotoluene, optionally in combination with tetrachloroethylene. The amount of solvent employed is that which provides a composition suitable for use as an easily applied adhesive and ordinarily such as to provide a total solids content (TSC) ranging from about 5 to 50 wt. %, preferably about 10 to about 30 wt. %, and more preferredly 10 to 20 wt. %.

In one embodiment the organosilane-containing component is an adduct (A) of an isocyanate-reactive organosilane and a molar excess of polyisocyanate that is co-reactive therewith. The organosilane is coupled through a functional hydrocarbyl group bonded directly to the silicon. This linkage can be represented in abbreviated fashion as —NH—C(O)—A—R—Si, wherein representative groups A include O, S, >N—, and R is a divalent hydrocarbyl $C_1$–$C_{20}$ group, especially $C_2$–$C_4$. Isocyanate-organosilane adducts are taught in U.S. Pat. No. 4,031,120, and prepared by reacting a multifunctional organosilane and a polyisocyanate, in dilute solution, conducted at a temperature in the range from about 10° C. to about 100° C. while agitating the mixture by a mechanical stirrer or similar device. An optional conventional catalyst, such as dibutyltin dilaurate, can be employed. The reaction is instantaneous and exothermic when catalysts are employed. It is essential that the amount of polyisocyanate present during the reaction be such as to ensure obtaining an resulting adduct having at least one free isocyanate group.

A specific illustration of an isocyanate-organosilane adduct is disclosed in U.S. Pat. No. 5,623,044 and is the reaction product of a secondary aminoalkoxy silane and a polyisocyanate. As an example, 485 g of HDI (Desmodur N-100 ex. Mobay) (2.59 equivalents) and 225 g of alkyl phthalate are charged to a resin kettle equipped with a mechanical agitator, a thermometer, a $N_2$ inlet adapter and an addition funnel. The mixture is thoroughly mixed and purged under $N_2$ blanket. About 300 g of silane (N,N-bis[(3-trimethoxysilyl)-propyl]amine) (0.88 equivalents) is slowly added to the mixture. The resulting adduct has an isocyanate content of 7.0%.

Representative isocyanate-reactive organofunctional silanes suitable for making an adduct with a polyisocyanate include without limitation the known silanes that contain an abstractible hydrogen, such as amino, mercapto, and hydroxy groups, —COOH, —NH—, —CONH$_2$, —CONH— including polyols, polyamines, polymercaptans and polyacids. Examples of starting silanes are N,N-bis[(3-triethoxysilyl)propyl]amine; N,N-bis[(3-tripropoxysilyl) propyl]amine; N-(3-trimethoxysilyl)propyl-3-[N-(3-trimethoxysilyl)-propylamino]propionamide; N-(3-triethoxysilyl)propyl-3-[N-3-triethoxysilyl)-propylamino] propionamide; N-(3-trimethoxysilyl)propyl-3-[N-3-triethoxysilyl)-propylamino]propionamide; 3-trimethoxysilylpropyl 3-[N-(3-trimethoxysilyl)-propylamino]-2-methyl propionate; 3-triethoxysilylpropyl 3-[N-(3-triethoxysilyl)-propylamino]-2-methyl propionate; 3-trimethoxysilylpropyl 3-[N-(3-triethoxysilyl)-propylamino]-2-methyl propionate; and the like. A commercial example silane is gamma-mercaptopropyl-trimethoxysilane (available as A189 from Union Carbide) or N,N'-bis((3-trimethoxysilyl)propyl) amine.

Aminofunctional organosilanes are most preferred and include but are not limited to aminofunctonal organosilanes having the structure (B)

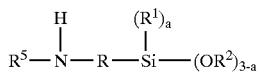

(B)

wherein R, R$^1$, R$^2$, and "a" are as previously defined for structure (A); and R$^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —R$^6$—NH—R$^7$, wherein R$^6$ is selected from the group consisting of divalent aliphatic, cycloaliphatic and aromatic radicals having from 1 to 20 carbons, there being preferably at least two carbon atoms separating any pair of nitrogen atoms, with R$^6$ being preferably an alkylene group of 2 to 9 carbon atoms; and R$^7$ being the same as R$^5$ and preferably is hydrogen. Specific representative isocyanate-reactive organosilanes, where "g" and "d" represent gamma and delta, respectively, are hydroxypropyltrimethoxysilane, hydroxypropyltriethoxysilane, hydroxybutyltrimethoxysilane, g-aminopropyltrimethoxysilane g-aminopropyltriethoxysilane, methylaminopropyltrimethoxysilane, g-aminopropyltripropoxysilane, g-aminoisobutyltriethoxysilane, g-aminopropylmethyldiethoxysilane, g-aminopropylethyldiethoxysilane, g-aminopropylphenyldiethoxysilane, d-aminobutyltriethoxysilane, d-aminobutylmethyldiethoxysilane, d-aminobutylethyldiethoxysilane, g-aminoisobutylmethyldiethoxysilane, N-methyl-g-aminopropyltriethoxysilane, N-phenyl-g-aminoisobutylmethyldieth oxysilane, N-ethyl-d-aminobutyltriethoxysilane, N-g-aminopropyl-g-aminopropyltriethoxysilane, N-beta-aminoethyl-g-aminoisobutyltriethoxysilane, N-g-aminopropyl-d-aminobutyltriethoxysilane, N-aminohexyl-g-aminoisobutylmethyldiethoxysilane, methylaminopropyltriethoxysilane, g-aminopropylmethoxydiethoxysilane, and the like. Examples of commercially available amino-functional organosilanes include Silquest™ Y-9669, N-phenyl-gamma-aminopropyltrimethoxysilane, Silquest™ A1170, bis-(g-trimethoxysilylpropyl)amine, Silquest™ A1100, gaminopropyltriethoxysilane, Silquest™ A1110, g-aminopropyltrimethoxysilane, and Silquest™ A1120, N-(β-aminoethyl)-gamma-aminopropyltrimethoxysilane, available from OSI, Inc.

Representative hydroxyl group-containing organosilanes include but are not limited to compounds of the general structure A:

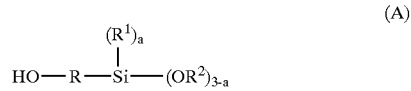

(A)

wherein R is a divalent aliphatic, cycloaliphatic or aromatic saturated or unsaturated radical having from 1 to 20 carbon atoms, and is preferably an alkylene radical having from 1 to 9, most preferably 2 to 4, carbon atoms; R$^1$ is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, and aryl radicals having 6, 10, or 14 nuclear carbon atoms, and including such aryl radicals containing one or more substituent alkyl groups having from 1 to 4 carbon atoms; R$^2$ is a monovalent aliphatic, cycloaliphatic or aromatic organic radical containing from 1 to 8 carbon atoms, and is preferably selected from the group consisting of alkyl radicals having from 1 to 4 carbon atoms, R$^3$—O—R$^4$, and

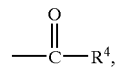

where R$^3$ is an alkylene group having from 1 to 4 carbon atoms (methyl, ethyl, propyl, butyl) and R$^4$ is an alkyl group having from 1 to 4 carbon atoms; and a is zero or 1, preferably zero;

Representative mercaptofunctional silanes reactive with polyisocyanates include but are not limited to those having the structure (C)

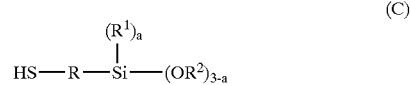

(C)

wherein R, R$^1$, R$^2$ and "a" are as previously defined for structures A or B; Commercially available mercaptosilane is sold by OSI as SILQUEST A-189, mercaptopropyltrimethoxysilane.

The preferred starting material organosilane comprises a single organic chain having from 1 to 20 carbon atoms bonded to silicon, said chain having at least one extractable hydrogen atom, said extractable hydrogen atom preferably being attached to a functional group separated from the silicon atom by at least 3 interconnected carbon atoms. The active hydrogen moiety is in any position in the molecule whereby this group displays significant activity according to the Zerewitnoff test described by Wohler in the Journal of the American Chemical Society, Vol. 49, p. 3181 (1927).

Starting polyisocyanates for making isocyanate-organosilane adducts (A) can be aliphatic aliphatic, cycloaliphatic, arylaliphatic, heterocyclic or aromatic polyisocyanate, or mixtures thereof, with an average isocyanate functionality of at least about 2.0 and an equivalent weight of at least about 80. Preferably, the isocyanate functionality of the polyisocyanate is at least about 2.0, more preferably at least about 2.2, and is more preferably at least about 2.3; and is preferably no greater than about 4.0, more preferably no greater than about 3.5, and is most preferably no greater than about 3.0. Examples of useful diisocyanates include 2,4-tolylene diisocyanate, 2,6-tolylene diisocyanate (TDI), diphenylmethane 4,4'-diisocyanate (MDI), 1,4-phenylene diisocyanate, dicyclohexylmethane diisocyanate ($H_{12}$-MDI), isophorone diisocyanate (IPDI), 1,6-hexanediisocyanate, and 1,3-($\alpha,\alpha,\alpha',\alpha'$-tetramethyl) xylylene diisocyanate (TMXDI) 2,2,4-trimethylhexamethylene-1,6-diisocyanate; hexamethylene-1,6-diisocyanate, diphenylmethane-4,4'-diisocyanate, triphenylmethane-4,4'4-triisocyanate, 3-isocyanatomethyl-3,5,5-trimethylcyclohexylisocyanate, polymethylene polyphenylisocyanate, m-phenylenediisocyanate, p-phenylenediisocyanate, 2,6-tolylene diisocyanate, 1,5-naphthalenediisocyanate, naphthalene-1,4-diisocyanate, diphenylene-4,4'-diisocyanate, 3,3'-bi-tolylene-4,4'-diisocyanate, ethylene diisocyanate, propylene-1,2-diisocyanate, butylene-2,3-diisocyanate, ethylidenediisocyanate, butylidenediisocyanate, xylylene-1,4-diisocyanate, xylylene-1,3-diisocyanate, methylcyclohexyldiisocyanate, cyclopentylene-1,3-diisocyanate, cyclohexylene-1,4-diisocyanate, 4,4'-methylene-bis(cyclohexylisocyanate), p-phenylene-2,2'-bis (ethylisocyanate), 4,4'-diphenylene ether-2,2'-bis (ethylisocyanate), tris(2,2',2"-ethylisocyanate benzene), 5-chloro-phenylene-1,3-bis(propyl-3-isocyanate), 5-methoxy-phenylene-1,3-bis(propyl-3-isocyanate), 5-cyanophenylene-1,3-bis(propyl-3-isocyanate), 4-methylphenylene-1,3-bis(propyl-3-isocyanate), and the like. Dimers known for instance from U.S. Pat. No. 2,671,082 and trimers of the above mentioned isocyanate functional compounds, for example those containing uretadione, biuret, and isocyanurate linkages can be employed. Preferred diisocyanate functional compounds include IPDI, MDI, and blends of 2,4-tolylene diisocyanate and 2,6-tolylene diisocyanate.

Isocyanatosilane adducts are prepared by effecting a reaction between a co-reactive organosilane and a polyisocyanate by adding the organosilane, preferably as a dilute solution, to the polyisocyanate, also preferably diluted, at a temperature in the range from about 10° to about 100° C., while agitating the mixture by a mechanical stirrer or similar device. While not essential, a suitable catalyst, e.g., dibutyltin dilaurate, can be employed. The reaction readily proceeds when catalyst is employed, and is mildly exothermic. The minimum molar equivalents of NCO, of polyisocyanate to form the preferred adduct is one molar equivalent of NCO in excess of the molar equivalents of NCO required to react with all the active hydrogen of the silane reactant.

In an alternative to adduct (A) as silane component in the adhesive is an isocyanatosilane such as are made by pyrolysis of carbamate (silylorganohalide and metal cyanate) or reacting silicon hydride and allyl isocyanate. Isocyanatosilanes containing at least 1, or more than one hydrolyzable group and at least one free isocyanate group are known in the art and typically represented by the structure

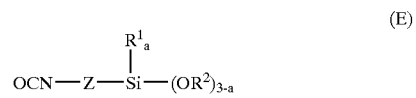

(E)

wherein $R^1$ is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, aryl radicals having 6, 10, or 14 nuclear carbon atoms, and such aryl radicals containing one or more substituent alkyl groups having from 1 to 4 carbon atoms; $R^2$ is a monovalent aliphatic, cycloaliphatic or aromatic organic radical containing from 1 to 8 carbon atoms and is preferably selected from the group consisting of alkyl radicals having from 1 to 4 carbon atoms, —$R^3$—O—$R^4$, and

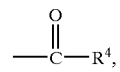

where $R^3$ is an alkylene group having from 1 to 4 carbon atoms and $R^4$ is an alkyl group having from 1 to 4 carbon atoms; a is zero or 1, and preferably is zero; and Z is a divalent organic radical attached to the silicon atom via a carbon-silicon bond. The exact nature of the Z radical is not critical, i.e., the radical can have any configuration and combination of groupings that are compatible with the isocyanato groups. For example, the Z radical can be a hydrocarbon radical, or it can contain linkages such as ether, ureido, urethane, and thiourethane linkages. The Z radical can contain substituent groups such as halogen. The isocyanatosilane preferably contains an average of at least one hydrolyzable silane group, and preferably two such groups in addition to at least one free isocyanate group per molecule. Useful ranges of molecular weight are from 200 to about 2,000. An example of an isocyanato silane useful in the present invention is Silquest™ A-1310, which is gamma-isocyanatopropyltriethoxysilane.

The adhesive can optionally further contain known and customary adjuvants including acid scavengers such as zinc oxide, magnesium oxide; lead salts such as dibasic lead phosphite, dibasic lead phthalate, monohydrous tribasic lead maleate, tetrabasic lead fumarate, and mixtures thereof; epoxy compounds or resins, such as glycidyl ethers of bisphenol A, epoxysilanes, and epoxyphenolics; fillers such as precipitated silica, $TiO_2$; reinforcing agents such as carbon black; and tinting or coloring agents such as color pigments and dyes.

The adhesive according to the invention is versatile and bonds a variety of elastomers and low-polarity polymeric substrates to structural parts, such as metallic window channels, trim strips, bumper guards, edge moldings and the like. The polymeric materials as well as the substrates are not limited as to the variety of compositions and shapes.

Shaped articles include foils, extrusion profiles, coils, injection molded parts that are bondable. Bonding of the polymer material can be to a similar or different material. A rigid thermoplastic can be bonded to an elastomeric material. An elastomer can be bonded to a dissimilar substrate such as wood, metal, or glass. Representative metals are selected from any of the common structural metals such as iron, steel (including stainless steel), lead, aluminum, copper, brass, bronze, MONEL®, nickel, zinc, and treated metals with phosphatizing, galvanizing, and the like. Prior to bonding, a metal surface is typically cleaned according to one or more methods known in the art such as degreasing, grit-blasting and zinc-phosphatizing. The non-metallic substrates include glass panels, woven or nonwoven glass fabrics, continuous rovings of glass, such as E-glass; fabrics, fibers or rovings of polyamides, polyester, and aramids, e.g., Kevlar, a trademark of E.I. du Pont de Nemours Co., (Inc.), Aluminum and steel profiles are especially bondable to TPE with the adhesive, in the absence of a nitroso compound. The bondable polymeric materials invention include the low surface energy (<45 dynes/cm) polyolefins (e.g. polypropylene, polyethylene, polyethylene-co-propylene, copolymers of $C_4$–$C_8$ α-olefins with ethylene and/or propylene, polyethylene foams, polypropylene foams, ethylene-propylene-diene terpolymer (EPDM) rubbers, ethylene-propylene rubbers (EPR), etc.), styrene-ethylene-butene-styrene copolymer (SEBS), styrene-ethylene-propylene-styrene copolymer (SEPS), styrene-isoprene-styrene (SIS) rubbers, styrene-butadiene-styrene (SBS) rubbers, to name a few of these.

The adhesive compositions are applied to the substrate surface in a conventional manner such as by dipping, spraying, brushing, and the like. The substrate surface is dried before contacting to the polymer to be bonded. In one bonding method, the surface has been treated with the adhesive and the polymer pressed together with the adhesive layer in between, and the assembly is heated to the desired temperature tolerated by the polymer. The conditions are preselected upon considering the particular polymer or elastomer being bonded and whether or not it is cured after contact or cured prior to contact with the substrate. If the polymer is a curable type and is uncured, the curing is to be effected during bonding, the conditions will be dictated by the polymer composition. Vulcanizable elastomers will generally be cured at a temperature of from about 140° C. to about 200° C. for a time ranging from about 5 to about 60 minutes. If the polymer of the curable type has been cured, the bonding temperature may range from about 90° C. to above 180° C. for from 15 to about 120 minutes.

Alternatively, in situations where applicable, the adhesives can be interspersed between the surfaces to be joined as a solid film or tape (100% solids adhesive system) with bonding being accomplished as before.

Extrusion Bonding

A preferred method aspect according to the invention includes the bonding of thermoplastic processed polymer to a continuous or elongated structural member which has been pre-treated with the adhesive. The treated member is passed adjacent to or through an extruder die, and joined to the molten polymer extrudate, followed by cooling of the joined article. The treated substrate may be preheated off-line, and may be brought to a desired temperature state at the time of joining with the extrudate. This can be effected by feeding an elongated structural profile, such as a metal strip, a shaped profile such as a channel into an extruder die adapted to receive the elongated member. Durable adhesion between the adhesive treated portion of the profile substrate and the extruded polymer is achieved with or without a previous heat treatment on the adhesive pre-treated substrate prior to joining in this known manner.

In another method aspect, a structural article is inserted by the piece into the cavity of an injection mold, melt processible polymer is injected into the closed mold cavity thereby contacting the pretreated surface of the inserted article, causing a bonding between the polymer and substrate. The adhesive is especially adapted for bonding thermoplastic injected polymer within the mold cavity in this known manner. This method comprises treating a predetermined side, or section of a side of a rigid substrate, e.g., stamped or shaped metal with the adhesive herein, and drying. The treated substrate is inserted into the cavity of the injection mold at a predetermined location, and the mold is closed. Molten thermoplastic is injected into the mold contacting the adhesive treated portion of the substrate. After cooling sufficient for ejecting the bonded article, the finished molding is ejected or removed from the parted mold. Durable adhesion between the adhesive treated portion of the inserted rigid substrate and the melt process polymer is achieved with or without a previous heat treatment on the adhesive-coated substrate prior to joining to the thermoplastic melt.

EXAMPLE 1

Adhesive examples A–I, were prepared by mixing.

| RAW MATERIALS | % DRY WEIGHTS | | | | | | | | |
| --- | --- | --- | --- | --- | --- | --- | --- | --- | --- |
| | A | B | C | D | E | F | G | H | I |
| Chlorinated polypropylene (A) | 95.0 | 87.0 | 80.0 | 89.0 | 80.0 | 67.0 | 80.0 | 67.0 | 57.0 |
| MDI - Poly diphenylmethane-diisocyanate (B) | | | | 11.0 | 20.0 | 33.0 | | | |
| Adduct of (A) and (C) | | | | | | | 20.0 | 33.0 | 43.0 |
| amino alkyl trimethoxy silane (C) | 5.0 | 13.0 | 20.0 | | | | | | |
| Total | 100.0 | 100.0 | 100.0 | 100.0 | 100.0 | 100.0 | 100.0 | 100.0 | 100.0 |

*** Adhesives above were prepared in xylene at solids ranges between 21–35%.

The above adhesives were applied to aluminum coil panels at a DFT of from 0.30 to 0.40 mils (0.10 mm). Adhesive was applied to the aluminum panels using a #40 draw down bar. Polymer materials injection molded to the adhesive treated panels which were inserted into the mold cavity were Santoprene® and Sarlink® TPE. Santoprene® is supplied by Advanced Elastomer Systems. Sarlink® supplied by DSM Elastomers. After the adhesive was applied to the metal panels, solvent was driven off by heating allowing a peak metal temperature of 435° F. (223° C.) in an oven set at 485° F. (251° C.).

Samples where indicated were preheated prior to injection molding bonding for 2'@ 250° F. (121° C.). In either instance, with or without a preheat, excellent bonds were obtained in accordance with the invention. Insert molding bonding was obtained using a Toyo® injection molding press under the following conditions: Injection Pressure 1,100 psi (7,000 kP), mold temperature: 160° F. (71° C.) Cooling cycle: 45 sec.; zone temperatures: 1–450° F. (232° C.), 2–450° F. (232°C.), 3–440° F. (226° C.), 4–430° F. (221° C.), and 5–420° F. (215° C.)

Adhesion testing was completed using pliers to peel the polymer from the metal substrate by hand. In the T-peel testing the aluminum panels bent often the adhesive was released from the metal. The percent adhesion represents the amount of polymer adhering to the metal substrate after peeling.

|  | Stainless steel | | | |
|---|---|---|---|---|
|  | Santoprene ® | | Sarlink ® | |
|  | 0' PREHEAT | 2' PREHEAT | 0' PREHEAT | 2' PREHEAT |
| ADHESIVE G | 83% | 98% | 93% | 75% |
| ADHESIVE H | 73% | 97% | 63% | 93% |
| ADHESIVE I | 55% | 55% | 88% | 89% |

EXAMPLE 2

The following adhesives were applied at 0.3–0.4 mils (0.07–0.10 mm) to aluminum coil panels to compare different film forming polymers. The peak metal temperature after drying the adhesive was 435° F. (224° C.) in an oven set at 500° F. (260° C.). Each TPE was dried overnite at 160° F. (71° C.) before molding.

| Adhesive in Xylene | | | | | | |
|---|---|---|---|---|---|---|
| Raw Materials | % TSC | 45A | 45B | 45C | 45D | 45E |
| Chlorinated polypropylene | 15 | 70 | 0 | 0 | 0 | 0 |
| Chlorosulfonated PE-1* | 10 | 0 | 70 | 0 | 0 | 0 |
| Chlorosulfonated PE-2* | 20 | 0 | 0 | 70 | 0 | 0 |
| Chlorinated NR* | 30 | 0 | 0 | 0 | 70 | 0 |
| Modified polyolefin (Eastman 440-1) | 25 | 0 | 0 | 0 | 0 | 70 |
| Silane adduct | 19.75 | 30 | 30 | 30 | 30 | 30 |
| % Total solids |  | 16.00 | 16.00 | 16.00 | 16.00 | 16.00 |
| Dry Wt % |  | 100 | 100 | 100 | 100 | 100 |

Mixing: Add adhesive and roll for 1 hour.
*as taught in U.S. Pat. No. 4,031,120 absent nitroso cpd.

|  | Santoprene ® | | Sarlink ® | |
|---|---|---|---|---|
| on aluminum | 0' PREHEAT | 2' PREHEAT | 0' PREHEAT | 2' PREHEAT |
| ADHESIVE A | 8% | 8% | 30% | 45% |
| ADHESIVE B | 0% | 0% | 0% | 0% |
| ADHESIVE C | 0% | 0% | 0% | 0% |
| ADHESIVE D | 10% | 5% | 98% | 60% |
| ADHESIVE E | 5% | 2% | 38% | 0% |
| ADHESIVE F | 0% | 0% | 70% | 0% |
| ADHESIVE G | 50% | 85% | 85% | 73% |
| ADHESIVE H | 50% | 55% | 73% | 85% |
| ADHESIVE I | 45% | 80% | 43% | 97% |

The combination of chlorinated polypropylene and silane-isocyanate adduct bonds a both types of TPE as indicated by the minimum 50% polymer retention by the hand-peel test, as compared to adhesives A–F containing either component alone. Improvement in bonding with and without a preheating step. Most of the failure mode was the result of the metal being bent during testing.

The above examples G, H and I were repeated using stainless steel as the substrate.

Insert molding bonded composites were obtained using a Toyo® injection molding press under the following conditions: Injection Pressure 1,100 psi (7,000 kP), mold temperature: 160° F. (71° C.) Cooling cycle: 45 sec.; zone temperatures: 1–450° F. (232° C.), 2–450° F. (232°C.), 3–440° F. (226° C.), 4–430° F. (221° C.), and 5–420° F. (215° C.)

Failure modes are: R-polymer; RC-polymer-to-adhesive; CM-adhesive-to-metal

| | Testing: Primary Adhesion | | | | |
|---|---|---|---|---|---|
| Adhesive | R | TR | RC | CM | CP |
| to Elastomer: Santoprene ® - 2"/min peel rate | | | | | |
| 45A | 99 |  | 1 |  |  |
|  | 95 |  | 5 |  |  |
|  | 97 | — | 3 | — | — |
| 45B |  |  | 100 |  |  |
|  |  |  | 100 |  |  |
|  | — | — | 100 | — | — |
| 45C |  |  | 100 |  |  |
|  |  |  | 100 |  |  |
|  | — | — | 100 | — | — |
| 45D |  |  | 100 |  |  |
|  |  |  | 100 |  |  |
|  | — | — | 100 | — | — |
| 45E |  |  | 100 |  |  |
|  |  |  | 100 |  |  |
|  | — | — | 100 | — | — |

-continued

Testing: Primary Adhesion

| Adhesive | R | TR | RC | CM | CP |
|---|---|---|---|---|---|
| to Elastomer: Sarlink ® - 2"/min peel rate | | | | | |
| 45A | 90 | | 10 | | |
| | 100 | | | | |
| | 95 | — | 10 | — | — |
| 45B | | | 100 | | |
| | | | 100 | | |
| | — | — | 100 | — | — |
| 45C | | | 100 | | |
| | | | 100 | | |
| | — | — | 100 | | |
| 45D | | | 100 | | |
| | | | 100 | | |
| | | | 100 | | |
| 45E | | | 100 | | |
| | | | 100 | | |
| | — | — | 100 | — | — |

The peel results illustrate that Example 2-A bonds metal well to both TPE polymers whereas example 2B–2F fails in adhesive to polymer mode.

EXAMPLE 3

The adhesive formulations of Example 2 were tested in bonding other polymers such as elastomers under compression molding during vulcanization without a prebake. The adhesives were spray applied on pre-heated (150° F./65° C.) zinc phosphatized steel panels. Dry film thickness was 1.0 mil (0.025 mm). The treated panels were each inserted in a compression mold and raw elastomer stock applied. The Elastomers were cured as follows:

Natural rubber 1–13'@ 340° F. (171° C.)
Natural rubber 2–13.5°@ 340° F. (171° C.)
Nitrile rubber 1–19.5°@ 340° F. (171° C.)
SBR 1–18'@ 340° F. (171° C.)
Peroxide cured EPDM-7.5°@ 340° f. (171° C.)
Peroxide cured silicone-5'@ 350° F. (176° C.)
"*" denotes sweep, a loss of bonding due to movement of adhesive by the injection melt flow in the mold.
Failure modes are: R-rubber; RC-rubber-to-cement; CM-cement-to-metal.
HP—denotes hand peeled. Where indicated, primary adhesion peel strength values in N/m were obtained per ASTM D429B.
Results:

Nat. Rubber 1

| Ex. | N/m | % R | % RC | % CM |
|---|---|---|---|---|
| 45A | HP | | 20 | 80 |
| | HP | | 40 | 60 |
| | — | — | 30 | 70 |
| 45B | HP | | 20 | 80 |
| | HP | | 40 | 60 |
| | — | — | 30 | 70 |
| 45C | HP | | 90 | 10 |
| | HP | | 10 | 90 |
| | — | — | 50 | 50 |
| 45D | HP | | 100 | |
| | HP | | 100 | |
| | — | — | 100 | — |
| 45E | HP | | 50 | 50 |
| | HP | | 30 | 70 |
| | — | — | 40 | 60 |

Nat. Rubber 2

| Ex. | N/m | R | RC | CM |
|---|---|---|---|---|
| 45A | HP | | | 100 |
| | 875 | | 75 | 25 |
| | 875 | — | 75 | 63 |
| 45B | HP | | 100 | |
| | HP | | 90 | 10 |
| | — | — | 95 | 10 |
| 45C | HP | | | 100 |
| | HP | | 10 | 90 |
| | — | — | 10 | 95 |
| 45D | HP | | 100 | |
| | HP | | 100 | |
| | — | — | 100 | — |
| 45E | HP | | 50 | 50 |
| | HP | | | 100 |
| | — | — | 50 | 75 |

Nitrile Rubber 1

| Ex. | N/m | % R | % RC | % CM |
|---|---|---|---|---|
| 45A | 7700 | 5 | | 95 |
| | 1068 | 30 | | 70 |
| | 9280 | 18 | — | 83 |
| 45B | 11031 | 5 | 10 | 85 |
| | 11381 | 10 | 10 | 80 |
| | 11206 | 8 | 10 | 83 |
| 45C | HP | | | 100 |
| | HP | | | 100 |
| | — | — | — | 100 |
| 45D | 16460 | 100 | | |
| | 18210 | 100 | | |
| | 17334 | 100 | — | — |
| 45E | HP | | | 100 |
| | HP | | 100 | |
| | — | — | 100 | 100 |

SBR 1

| Ex. | N/m | % R | % RC | % CM |
|---|---|---|---|---|
| 45A | 13132 | 10 | 70 | 20 |
| | 7879 | | 80 | 20 |
| | 10506 | 10 | 75 | 20 |
| 45B | 9105 | 5 | 20 | 75 |
| | 8579 | | 20 | 80 |
| | 8930 | 5 | 20 | 78 |
| 45C | HP | | 5 | 95 |
| | 6303 | | 10 | 90 |
| | 6303 | — | 8 | 93 |
| 45D | HP | | 100 | |

-continued

SBR 1

| Ex. | N/m | % R | % RC | % CM |
|---|---|---|---|---|
| | HP | | 100 | |
| | — | — | 100 | — |
| 45E | HP | | 100 | |
| | HP | | 50 | 50 |
| | — | — | 75 | 50 |

EPDM

| Ex. | N/m | % R | % RC | % CM |
|---|---|---|---|---|
| 45A | 6828 | 95 | 5 | |
| | 8755 | 85 | 10 | 5 |
| | 7879 | 90 | 8 | 5 |
| 45B | 6128 | 30 | | 70 |
| | 5077 | 10 | | 90 |
| | 5603 | 20 | — | 80 |
| 45C | 2626 | | 5 | 95 |
| | 2276 | | 5 | 95 |
| | 2451 | — | 5 | 95 |
| 45D | 4902 | 95 | 5 | 5 |
| | 5253 | 60 | 40 | |
| | 5077 | 78 | 23 | — |
| 45E* | 3151 | 5 | | 95 |
| | 3677 | 5 | 65 | 30 |
| | 3502 | 5 | 65 | 63 |

Silicone

| Ex. | % R | % TR | % RC | % CM |
|---|---|---|---|---|
| 45A | | | 100 | |
| | | | 100 | |
| | — | — | 100 | — |
| 45B | | | 100 | |
| | | | 100 | |
| | — | — | 100 | — |
| 45C | | | 100 | |
| | | | 100 | |
| | | | 100 | |
| | — | — | 100 | — |
| 45D | | | 100 | |
| | | | 100 | |
| | — | — | 100 | — |
| 45E* | | | 80 | 20 |
| | | | 70 | 30 |
| | — | — | 75 | 25 |

What is claimed is:

1. A liquid adhesive comprising an organosilane-containing component selected from the group consisting of a organosilane-isocyanate adduct and an isocyanato-organosilane, a polymer comprising post-chlorinated propylene repeating units with a weight average molecular weight of from 5,000 to 60,000 and a chlorine content of from 10 wt % to 60 wt. %, and an organic solvent.

2. The adhesive according to claim 1 wherein said polymer is selected from crystalline polypropylene, noncrystalline polypropylene, ethylene-propylene copolymer, ethylene-propylene-diene copolymer, and propylene-$C_4$–$C_{10}$-α-olefin copolymer.

3. The adhesive according to claim 1 wherein said organic solvent is selected from the group consisting of aromatic and halogenated aromatic hydrocarbons.

4. The adhesive according to claim 1 having a total solids content of from 5 to 50 wt. %.

5. The adhesive according to claim 1 wherein said organosilane-containing component is a organosilane-isocyanate adduct containing the linkage —NH—C(O)—A—R—Si, wherein A is O, S, or N, and R is a divalent $C_1$–$C_{20}$ hydrocarbyl group.

6. The adhesive according to claim 1 wherein the organosilane-containing component is an isocyanatosilane containing at least one hydrolyzable group and at one free isocyanate group and having the structure (E)

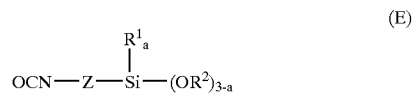

(E)

wherein $R^1$ is a monovalent aliphatic, cycloaliphatic or aromatic radical having from 1 to 20 carbon atoms; $R^2$ is a monovalent aliphatic, cycloaliphatic or aromatic organic radical containing from 1 to 8 carbon atoms, —$R^3$—O—$R^4$, and

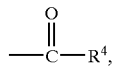

where $R^3$ is an alkylene group having from 1 to 4 carbon atoms and $R^4$ is an alkyl group having from 1 to 4 carbon atoms; a is zero or 1, and Z is a divalent organic radical attached to the silicon atom via a carbon-silicon bond.

7. A method for joining a polymer extrudate to a continuous or elongated structural member which has been treated with an adhesive comprising an organosilane-containing component selected from the group consisting of a organosilane-isocyanate adduct and an isocyanato-organosilane, a polymer comprising post-chlorinated propylene repeating units and having a weight average molecular weight of from 5,000 to 60,000 and a chlorine content of from 10 wt. % to 60 wt. % and an organic solvent, said method comprising passing the adhesive-treated substrate adjacent to or through an extruder die, and joining the member to the extrudate to form a joined article, and cooling the joined article.

8. The method of claim 7 wherein said joined article is a window channel.

9. A method for joining an injection molded polymer to a structural member which has been treated with an adhesive comprising an organosilane-containing component selected from the group consisting of a organosilane-isocyanate adduct and an isocyanato-organosilane, a polymer comprising post-chlorinated propylene repeating units and having a weight average molecular weight of from 5,000 to 60,000 and a chlorine content of from 10 wt. % to 60 wt. % and an organic solvent, said method comprising inserting the adhesive-treated member into an injection mold cavity adapted to receive the member, exposing an adhesive-treated surface of the member to the mold cavity, injecting said polymer into the cavity contacting the polymer with the treated surface of the member, and cooling the polymer.

10. A liquid adhesive comprising an organosilane-containing component selected from the group consisting of a organosilane-isocyanate adduct and an isocyanato-organosilane, a maleated polymer comprising post-chlorinated propylene repeating units, and an organic solvent.

* * * * *